United States Patent
Reiley et al.

(10) Patent No.: US 6,699,102 B2
(45) Date of Patent: Mar. 2, 2004

(54) LAPPING MONITOR FOR MONITORING THE LAPPING OF TRANSDUCERS

(75) Inventors: Timothy Clark Reiley, Los Gatos, CA (US); Thomas Robert Albrecht, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/759,830

(22) Filed: Jan. 12, 2001

(65) Prior Publication Data

US 2002/0094758 A1 Jul. 18, 2002

(51) Int. Cl.[7] .............................................. B24B 49/00
(52) U.S. Cl. ................................................ 451/8; 451/5
(58) Field of Search ............................. 451/8, 1, 6, 5; 29/603.1, 603.09, 603.13

(56) References Cited

U.S. PATENT DOCUMENTS

| 4,675,986 A | | 6/1987 | Yen | |
|---|---|---|---|---|
| 5,463,805 A | * | 11/1995 | Mowry et al. | 29/603 |
| 5,494,473 A | * | 2/1996 | Dupuis et al. | 451/1 |
| 5,559,051 A | | 9/1996 | Voldman et al. | |
| 6,027,397 A | * | 2/2000 | Church et al. | 451/1 |
| 6,230,389 B1 | * | 5/2001 | Zhu | 29/603.1 |

* cited by examiner

*Primary Examiner*—Dung Van Nguyen
(74) *Attorney, Agent, or Firm*—Lumen Intellectual Property Services, Inc.

(57) ABSTRACT

A lapping monitor for monitoring the lapping of a lapping surface of a body having at least one transducer which has a height that has to be lapped. The lapping monitor has a lap unit for lapping the lapping surface, at least one lapping indicator mounted close to the transducer to indicate the height of the transducer and a control block in the body at a certain distance from the lapping indicator or indicators. It is also possible to use a property of the transducers themselves, e.g., their resistance, to indicate their height. The control block receives indication of the height of the transducers being lapped from the lapping indicators or from the transducers via an electrical connection. The control block is further equipped with test contacts for establishing an external connection. The lapping monitor is particularly well-suited for performing 4-point resistance tests of the lapping indicators or transducers and can be effectively employed in lapping rows of magnetoresistive transducers such as MR or GMR heads to accurate heights.

25 Claims, 4 Drawing Sheets

LAPPING MONITOR FOR MONITORING THE LAPPING OF TRANSDUCERS

FIELD OF THE INVENTION

This invention relates generally to lapping or grinding of bodies having transducers, more particularly, it relates to the monitoring of the lapping of transducers at the lapping surface.

BACKGROUND OF THE INVENTION

Many present day fabrication techniques include a grinding or lapping step in which a workpiece or body is lapped by a lapping mechanism such as a lap plate. Lapping frequently serves purposes other than just polishing of the surface being lapped. In many situations, the purpose of lapping is also to trim in a controlled manner one or more elements of the body being lapped at the surface being lapped, i.e., the lapping surface. For example, the body may have a number of embedded parts which are to be lapped to an accurate height or width.

Currently, lapping plays a key part in the fabrication of transducers such as magnetic recording heads embedded in a body of silicon. The body is later used as an air bearing slider, while the lapping surface becomes the air bearing surface of the slider. The height of the heads is trimmed during the lapping operation at the lapping surface. This lapping surface is orthogonal to the surface of the silicon wafer on which the heads are fabricated. The lapping operation removes material from the head, and in particular the stripe of the head such that the height of the stripe is reduced to achieve the sensitivity required. Typically, the final height of such stripe is less than 1 micron. The variation in stripe height must also be quite small to meet the signal requirements for modern disk drives. This variation is currently about 50 nm.

One common device used to control the lapping process is an "electronic lapping guide" ELG. The ELG is a resistor which is fabricated together with the read head element and is in a well-defined orientation with respect to the head element. Any narrowing of the ELG reflects an equivalent narrowing of the stripe belonging to the head. Further information about ELGs can be found in U.S. Pat. No. 4,675,986 to Yen.

The prior art describes the use of the head itself and its changing electrical property, e.g., its resistance, for controlling the lapping process. One of the problems with using the head itself as a lapping indicator is that the lead resistance necessary to connect to it during lapping decreases the accuracy with which the actual head resistance can be measured. Hence, one commonly accepted practice is to use an ELG having a larger resistance than the head, thereby improving the resolution of the measurement.

Another difficulty encountered in using the head as the lapping indicator is that the head is very narrow. This narrow width, coupled with lead connections with a height much larger than the width of the head, results in a nonlinear relationship between stripe height and resistance.

The prior art teaches two generic approaches to the lapping of heads including magnetoresistive (MR) and giant magnetoresistive (GMR) heads. The first is to fabricate a single row of heads on a silicon wafer and lap that row of heads simultaneously. More information about this process can be found in U.S. Pat. No. 5,559,051 to Voldman et al.

Most or all of the heads have an associated ELG for monitoring their height during the lapping process. The connections to the ELGs are typically established by pressure contacts or wirebonded contacts. It is rather difficult to make pressure contacts reliably. Therefore, large contact forces have to be used. Even so, some lapping process tolerance is needed to accommodate incomplete contacts to ELGs monitoring some of the heads. The contact assemblies used to establish contact with the ELGs have precise dimensions, necessitated by the small head and contact size, and may be rather expensive. Wirebonding can also be an expensive alternative.

The second generic lapping approach handles groups of rows together. A single row is lapped, then cut from the group, typically with a diamond saw. In this case it is convenient to place the ELG contacts in the kerf, (or the area of the saw cut), above the row being lapped. When the lapped row is cut off, the saw removes the ELG contacts. Contact is commonly made using pressure contacts between a flex circuit and the ELG contact on the group of rows (also referred to as quad). The flex circuit carries the signals to the resistance measuring device located elsewhere.

A substantial problem arises because of the contact force needed to make contact with the ELGs. The problem is due to the elastic distortion generated upon loading, and the subsequent relaxation upon unloading. Specifically, the body is lapped to a high degree of flatness in the loaded state and, upon unloading, becomes distorted in the opposite direction to that which was imposed during the loading process.

Another problem is becoming more crucial as lapping precision is being improved. There is an uncertainty in the resistance measurement of the ELGs due to the resistance of the leads between the ELG and the measurement point. More precise 4-point resistance test could overcome this problem, but would require more contacts to the ELG and would further contribute to the elastic distortion problem.

Therefore, it would be an advance to provide a method for monitoring the lapping of transducers such as magnetoresistive heads while avoiding the problems associated with elastic deformation and allowing for very precise lapping control and accurate resistance readings.

OBJECTS AND ADVANTAGES OF THE INVENTION

Accordingly, it is a primary object of the present invention to provide a lapping monitor and lapping method which reduce the loading or contact forces placed on the body bearing the transducers. Specifically, it is an object of the invention to reduce the loading while at the same time making it possible to perform 4-point resistance tests to accurately monitor the lapping of the transducers.

It is another object of the invention to adapt the lapping monitor to the lapping of magnetoresistive heads in air bearing sliders.

These and other objects and advantages will be apparent upon reading the following description and accompanying drawings.

SUMMARY OF THE INVENTION

These objects and advantages are attained by a lapping monitor for monitoring the lapping of a lapping surface of a body such as a silicon body, a wafer or wafer portion. The body has at least one transducer which has a height that has to be lapped, e.g., in order to achieve a well-defined desired transducer height. The lapping monitor has a lap unit for lapping the lapping surface. At least one lapping indicator is mounted close to the transducer such that it indicates the height of the transducer. A control block is provided in the body at a certain distance from the lapping indicator or indicators. The control block is set to receive indication of the height of the transducer from the lapping indicators. An electrical connection for communication between the lapping indicators and the control block is also provided. Test contacts are provided on the control block for establishing an external connection to the control block, e.g., for passing on the information about transducer heights to external circuitry for further processing.

In one embodiment, the lapping monitor also includes a contact assembly for contacting the test contacts to establish the external connection. The contact assembly is equipped with contacting elements such as pins or other elements which can make reliable electrical contact with the test contacts. The test contacts are preferably located on the control block itself. The electrical contact can be established by pressing the contact assembly, and specifically its contacting elements against the test contacts. Alternatively, the electrical contact can be established by wirebonds to the test contacts.

The lapping monitor is convenient for use in situations where there are numerous transducers and lapping indicators. In such situations each lapping indicator can be associated with one of the transducers whose height is being lapped. Alternatively, one lapping indicator can be used to indicate the lapping height of more than one of the transducers. When monitoring the lapping of a number of transducers with a number of lapping indicators the control block is preferably equipped with a multiplexing logic for multiplexed communication with the lapping indicators. In this manner a large number of lapping indicators can be efficiently interrogated about the lapping height of the transducers.

The lapping monitor of the invention is particularly well-suited for performing 4-point resistance tests on the lapping indicators to derive the height of the transducers. To perform this test, control block has a corresponding testing logic.

The lapping monitor of the invention can be used in situations where the body is a silicon wafer or a part thereof, e.g., a segment cut from a silicon wafer with a set of transducers. The set of transducers can be a set of magnetoresistive transducer heads for reading and writing data in magnetic media. Exemplary magnetoresistive transducer heads include MR heads, GMR heads or other advanced heads. The transducer heads can be mounted in a row on the silicon wafer and the control block can be located at the end of that row.

In another embodiment, the lapping monitor uses a property of the transducer or transducers for monitoring the height to which the one or more transducers have been lapped. In this case the transducer plays the role of the lapping indicator by providing the control block with an indication of the height. The communication takes place over an electrical connection between the transducer or the set of transducers and the control block. In this embodiment a contact assembly for contacting the test contacts on the test block to establish external connection can also be provided. Likewise, the control block can have suitable multiplexing logic for multiplexed communication with the set of transducers. Furthermore, it is also preferable to use the 4-point resistance test when using the transducers themselves to indicate their heights.

In accordance with one method of the invention the monitoring of the lapping of a lapping surface of the body equipped with the one or more transducers is performed by using lapping indicators. In another embodiment of the method, the transducers themselves are used to indicate their height and thus monitor the lapping process. In either embodiment of the method, it is preferable to employ the 4-point resistance test.

The details of the invention are explained in the below detailed description with reference to the attached drawing figures.

DETAILED DESCRIPTION

Figure 1:
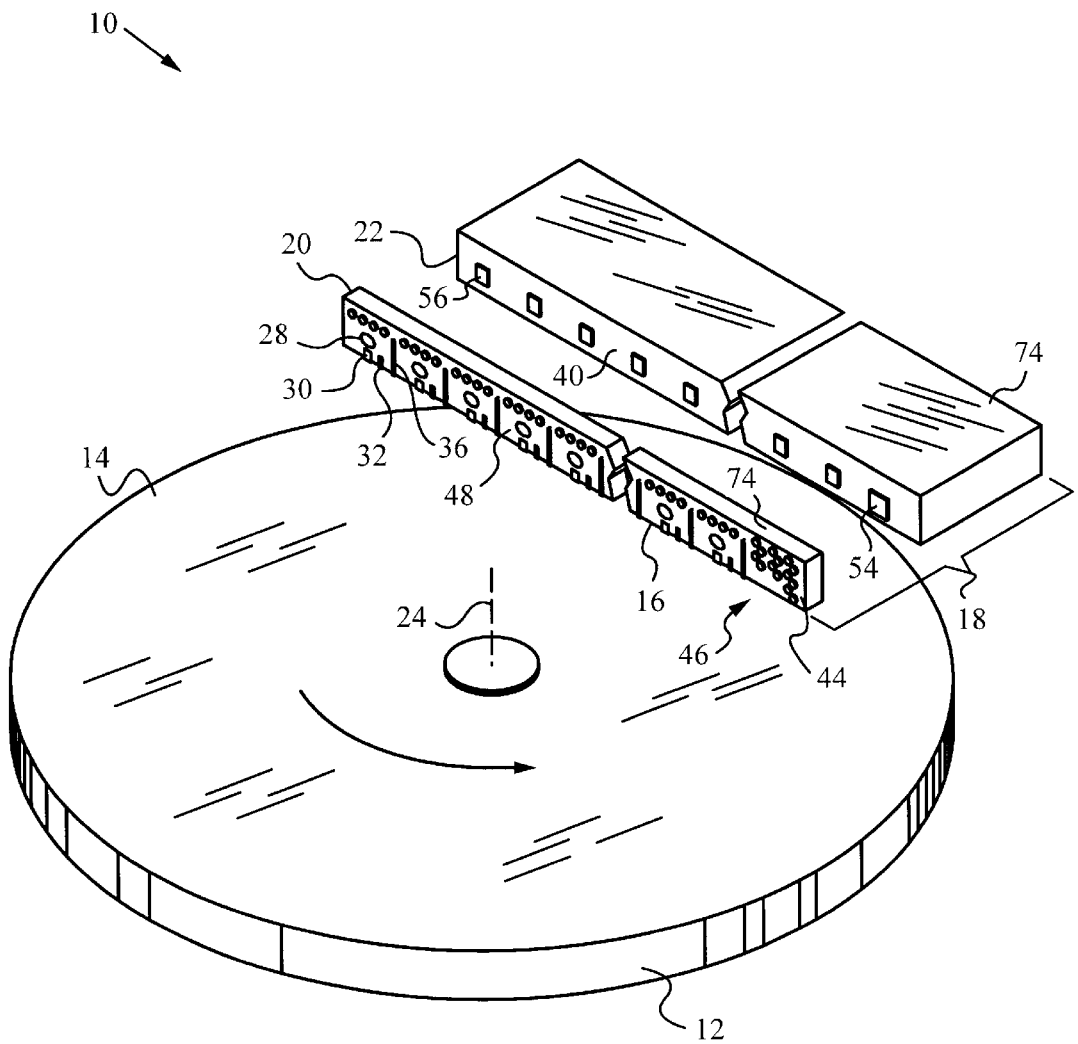
FIG. 1 is an isometric view of a lapping monitoring system according to the invention.

FIG. 1 illustrates a lapping monitor 10 in accordance with the invention. Lapping monitor 10 is employed in conjunction with a lapping unit 12, here in the form of a lap disk or plate. Lap plate 12 has an abrasive surface 14 which grinds or laps a bottom surface or lapping surface 16 of a body 18 as plate 12 rotates. During the lapping process plate 12 rotates around an axis of rotation 24 and abrasive surface 14 contacts lapping surface 16 to remove material from it.

Body 18 is a block of material, typically a silicon block or portion of a silicon wafer. For better illustration, body 18 is shown in an exploded view divided into a front portion 20 and a back portion 22. In practice, front and back portions 20, 22 form one whole. Front portion 20 has in it a number of transducers 26 arranged in a row. Transducers 26 can be transducer elements used for sensing physical quantities such as temperature, electric field, magnetic field and the like. In the present embodiment transducers 26 are magnetoresistive transducers. In particular, transducers 26 can be magnetoresistive (MR) heads, giant magnetoresistive (GMR) heads other advanced heads or elements which respond to changing magnetic fields with a corresponding change in a resistive property.

Figure 2:
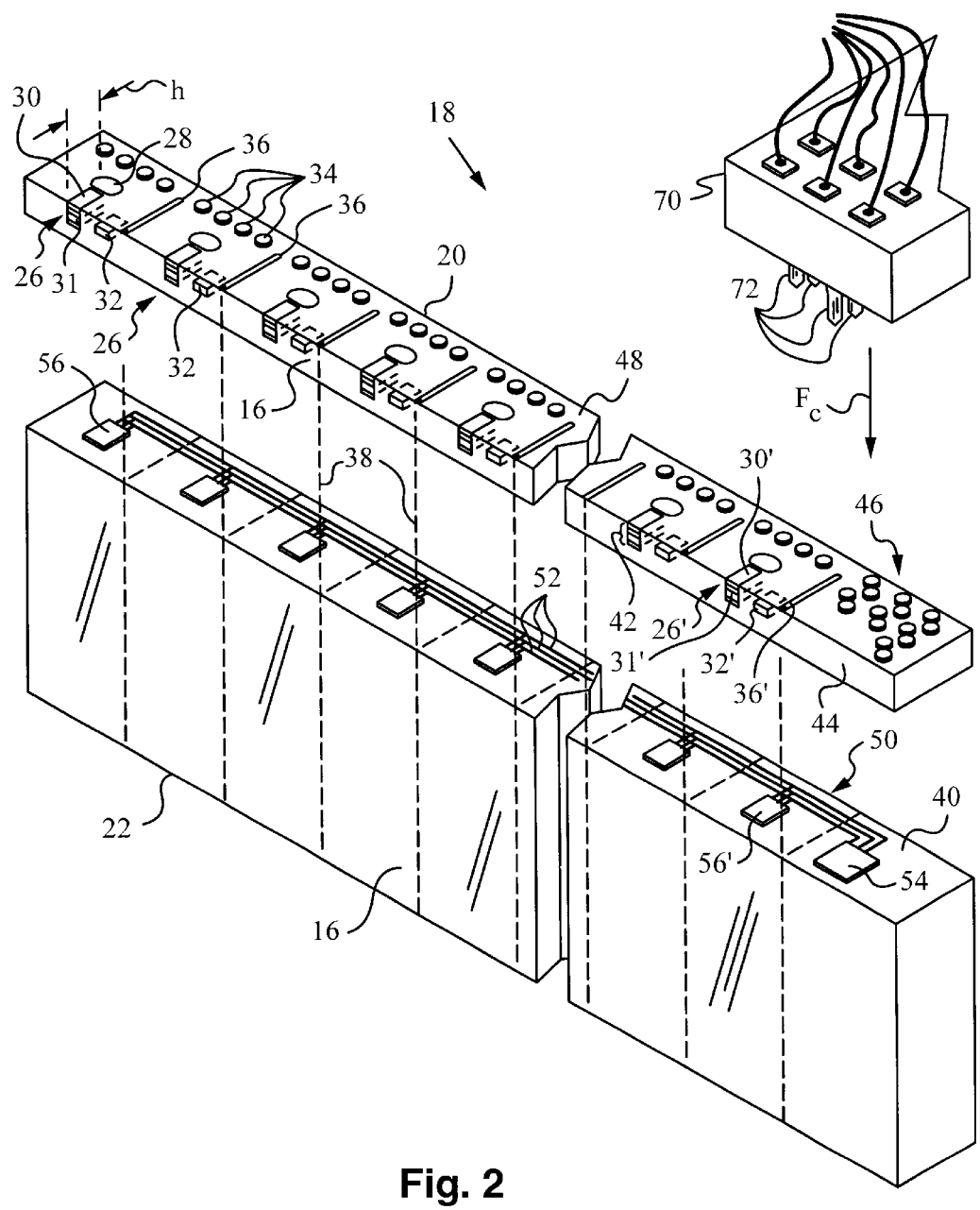
FIG. 2 is an enlarged isometric view of a portion of the lapping monitoring system of FIG. 1.

Referring to FIG. 2, each magnetoresistive head 26 has a head portion 28 and a stripe 30. Each stripe 30 has an active layer 31 or a read layer whose height h is defined from its end at lapping surface 16. In this embodiment it is the height h of layer 31 of head 26 which has to be accurately lapped to ensure proper functioning of head 26.

Each magnetoresistive head 26 has an associated set of elements including a lapping indicator 32 and one or more bonding pads 34. It will be appreciated by a person skilled in the art, that the dimensions of body 18 depend on the use of heads 26.

In the present embodiment, heads 26 are indented for use as read/write elements in air bearing sliders, whose air bearing surfaces or portions thereof correspond to lapping surface 16. The air bearing sliders will be cut from body 18 after the lapping process. Each head 26 and its associated set of elements are shown to be separated from adjacent heads 26 and their associated sets of elements by separators or slots 36 located at the point where the sliders will be cut from body 18. It will be understood that slots 36 represent an optional feature that can allow the individual sliders to be mechanically more isolated from the adjacent sliders. Both slotted and unslotted bodies 18 are viable, as will be appreciated by a person skilled in the art.

Front portion 20 is typically fabricated layer by layer on top of a surface 40 of back portion 22. For example, surface 40 is a surface of a wafer which serves as a substrate on which front portion 20 is produced by a combination of photolithography, deposition, implantation etching, plating and/or any other suitable techniques. Magnetoresistive heads 26 are fabricated in layers generally referred to by reference 42. The functions of each of the layers 42 and the associated fabrication requirements are known in the art.

Lapping indicators 32 are deposited along with active layers 31 of layers 42 constituting magnetoresistive heads 26. Depositing layer 31 and lapping indicators 32 at the same time ensures their mutual alignment. This alignment, in turn, ensures that the height h of layers 31 is accurately monitored by lapping indicators 32.

In the present embodiment, lapping indicators 32 are electronic lapping guides commonly referred to as ELGs deposited next to heads 26. During the lapping process the height of ELGs 32 changes and thus their resistance changes as well. Because ELGs 32 are lapped in concert with stripes 30 of heads 26, the change in resistance of ELGs 32 is indicative of the change in height h of active layer 31. The principles of operation of ELGs are known in the art.

Of course, lapping indicators 32 can also consist of other elements which, when positioned close to heads 26 and lapped along with them, provide an indication of height h of stripes 30 and specifically of active layers 31 of heads 26. In the present embodiment each head 26 has a corresponding ELG 32. This, however, is not required. It is possible to have fewer or more ELGs 32 associated with each head 26.

The fabrication of front portion 20 further can include the making of slots 36, for mechanical isolation of heads 26 during lapping, and the deposition of bonding pads 34. Bonding pads 34 are preferably made of a metal.

In accordance with the invention, lapping monitor 10 has a control block 44. Control block 44 is a part of body 18; in this case control block 44 is located at the end of the row of heads 26 and is separated from last head 26' in the row by optional slot 36'. Control block 44 has test contacts 46 mounted on a surface 48 of front portion 20 of body 18. Test contacts 46 are provided on control block 44 for establishing an external connection to control block 44. The external connection is provided for passing the information about heights h of heads 26 and specifically the heights of active layers 31 to external circuitry. Such external circuitry can include resistance measurement units which actually perform the resistance measurement from the signals obtained from ELGs 32. In addition, external circuitry can include mechanisms controlling the lapping process or the drive controlling lap plate 12 and/or any other units involved in controlling and monitoring the lapping process.

A contact assembly 70 is provided for establishing the external connection. Assembly 70 is equipped with contacting elements 72 such as pins or other elements which can make reliable electrical contact with test contacts 46. The electrical contact is established by pressing the contact assembly, and specifically its contacting elements 72 against test contacts 46 with a contact force $F_c$. The application of the contact force is frequently referred to as loading.

The location of test contacts 46 should be selected such that the application of contact force $F_c$ at contacts 46 does not significantly affect ELGs 32 and heads 26. In other words, the application of contact force $F_c$ at test contacts 46 by contacting elements 72 of assembly 70 should not, upon its removal, affect the shape of body 18 at ELGs 32 and heads 26. In particular, contact force $F_c$ on test contacts 46 should not significantly affect indications of height h of active layers 31 obtained from ELGs 32.

To further reduce the effects of contact forces at test contacts 46 on ELGs 32 and heads 26, block 44 is located at a certain distance from nearest ELG 32' which measures the height h of active layer 31' of head 26'. It is preferable, that control block 44 be located as far from heads 26 and lapping indicators 32 as possible, and especially as far as possible from ELG 32' and head 26'.

An alternative to the application of force to test contacts 46 is to wirebond directly to them, thereby avoiding the use of contact assembly 70. Since wirebonding can add expense to the lapping process, and since this expense increases with the number of wirebonds, the viability of this approach is improved as the number of wirebonds is decreased. Furthermore, as the number of wirebonds decreases the amount of area on control block 44 needed for wirebonds decreases. For this reason, and because this area can not be used for heads 26, it is generally preferable to minimize it.

Control block 44 receives indication of heights h of active layers 31 of heads 26 from ELGs 32 through an electrical connection 50. Electrical connection 50 consists of a number of conductors 52, in this case conductive traces deposited on surface 40 of back portion 22. In the present embodiment, surface 40 is the surface of the silicon wafer which serves as the substrate for fabricating front portion 20. The surface of the silicon wafer is made to be insulating to electrically isolate conductors 52 from each other. Conductors 52 ensure electrical communication between each one of ELGs 32 and a logic element 54 of control block 44. Conveniently, each head 26 has an associated cell circuit 56 including an address decoder which routes the electrical signals between the corresponding ELG 32 and logic element 54. Cell circuits 56 are preferably used for multiplexed communications requiring fewer conductors 52 for communicating with ELGs 32. A person skilled in the art will be able to employ the appropriate multiplexing techniques.

Figure 3A:
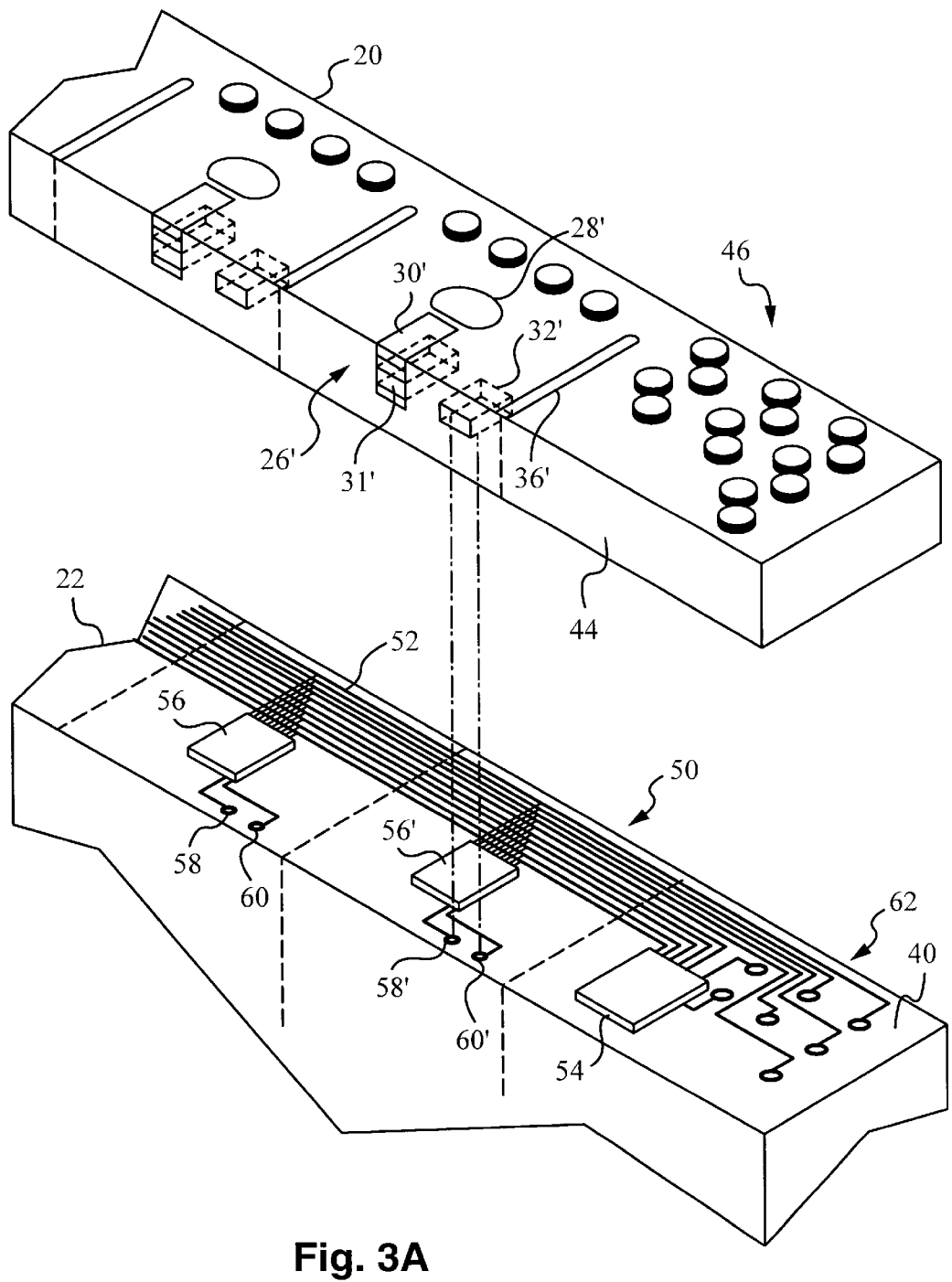
FIG. 3A is an isometric view of the electrical connections between lapping indicators and a control block in the lapping monitoring system of FIG. 1.

FIG. 3A illustrates electrical connection 50 between logic element 54 and cell circuits 56, including the nearest cell circuit 56', in more detail. It is understood that traces 52 connect remaining cell circuits 56 in the row of heads 26 to logic element 54 in a similar manner. It is also understood, that the discussion of cell circuit 56' and its communications with logic 54 applies to remaining cell circuits 56. Now, cell circuit 56' has two traces leading to contacts 58' and 60'. Contacts 58', 60' are spaced apart and correspond to two points at which the change in resistance of ELG 32' is measured. Electrical connection between contacts 58', 60' and the points in ELG 32' is established by conductive vertical vias extending through front portion 20 along the dashed and dotted lines.

During the lapping process cell circuit 56' is interrogated for the resistance of ELG 32'. This resistance is indicative of height h of active layer 31 in stripe 30'. Measurement of resistance between points 58' and 60' yields the resistance of ELG 32'. Preferably, a 4-point resistance test rather than a 2-point test is used to measure the resistance of ELG 32'. The 4-point resistance test is a technique known to the person of average skill in the art and can be performed by the connection of both voltage measurement and current supply leads to points 58' and 60'.

The resistance of ELG 32' is communicated to logic 54 via electrical connection 50. A set of contacts 62 is provided next to logic element 54 in control block 44. Contacts 62 are connected to electrical connection 50, logic element 54 and test contacts 46 on surface 48. The electrical connection between contacts 62 and test contacts 46 can be accomplished by vertical conductive vias (not shown) or any other suitable means. Thus, resistance of ELG 32' and hence height h of active layer 31' stripe 30' can be communicated to external circuitry, e.g., mechanisms controlling the lapping process through test contacts 46. The external connection is performed by pressing pins 72 of contact assembly 70 against test contacts 46, as described above (see FIG. 2).

Since pressure between contact assembly 70 and body 18 is limited to contact force $F_c$ applied between pins 72 and test contacts 46 at control block 44, the amount of bowing experienced by body 18 is kept to a minimum. Additionally, the test contacts 46 and logic element 54 in body 18 together with multiplexed communications permit implementation of the 4-point resistance test without requiring additional loading or contact forces near ELGs 32 or heads 26. Thus, lapping monitor 10 of the invention obtains more reliable resistance data from ELGs 32 and consequently more accurate information about lapping heights h of active layers 31 of stripes 30. Also, the application of multiplexed communications for interrogating ELGs 32 reduces the overall number of test contacts 46 required.

Throughout the lapping operation, logic element 54 interrogates ELGs 32 to determine the heights h of active layers 31 of stripes 30. Once the desired height h is reached the lapping operation is halted. After being lapped body 18 can be further processed, e.g., by being diced into individual air bearing sliders, each carrying one head 26. Because contact force $F_c$ was applied away from heads 26 and away from the ultimate air bearing sliders, lapping surface 16, which is used as the air bearing surface in the finished sliders, is minimally affected. In particular, the air bearing surface does not exhibit deleterious curvature or bowing after detachment from block 70 after the lapping process.

Lapping monitor 10 is convenient for use in situations where there are numerous transducers and lapping indicators. Most commonly, the transducers are mounted in a row, as in the embodiment described above. In such situations each lapping indicator can be associated with one of the transducers next to it, or two transducers, one on each side. Of course, one lapping indicator can also be used for more than two transducers.

Figure 3B:
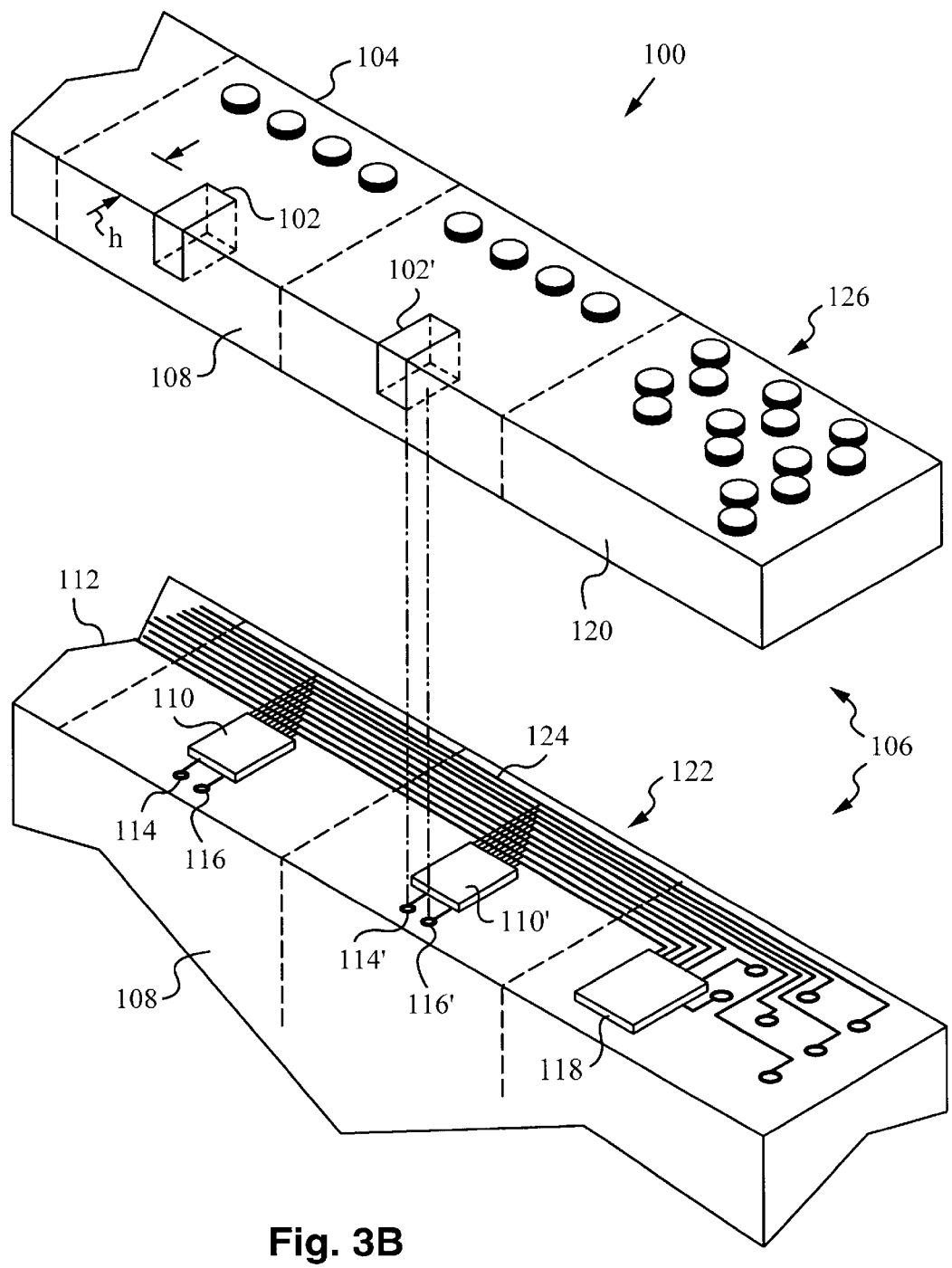
FIG. 3B is an isometric view of the electrical connections between the transducers and a control block.

FIG. 3B illustrates a portion of a monitoring system 100 in which an electronic property of transducers 102 is used for monitoring their height h. Transducers 102 are mounted in a row in a front portion 104 of a body 106 with a lapping surface 108 to be lapped. The lapping process and general arrangement of body 106 for lapping is analogous to the previous embodiment and will not be described.

Only the rightmost section of front portion 104 of body 106 is shown in FIG. 3B. In this embodiment transducers 102 exhibit a changing resistance as a function of their height h. Because of this property, transducers 102 are used directly for monitoring their own height h.

A control block 120 with a logic element 118 is connected to cell circuits 110. In particular, logic element 118 is connected by an electrical connection 122 to cell circuits 110. Only rightmost cell circuit 110' will be discussed, as this discussion applies to the remaining cell circuits 110. Electrical connection 122 is formed by a number of conductive traces 124 which allow logic 118 to address cell circuit 110'.

Cell circuit 110' has two contacts 114', 116' connected to it by two corresponding traces. Contacts 114', 116' are spaced apart and correspond to two points at which the change in resistance of transducer 102' is measured. Electrical connection between contacts 114', 116' and the points in transducer 102' is established by conductive vias extending through front portion 104 of body 106 along the dashed and dotted lines.

During the lapping process cell circuit 110' is interrogated for the resistance of transducer 102'. The change in resistance of transducer 102' is indicative of its changing height h as material is being removed from lapping surface 108. Preferably, a 4-point resistance test rather than a 2-point test is used to measure the resistance of transducer 102'.

The resistance of transducer 102' and hence its height h can be communicated to external circuitry, e.g., mechanisms controlling the lapping process through test contacts 126. The external connection can be performed with the aid of a contact assembly similar to the one used in the previous embodiment or by wirebonds to test contacts 126. For efficient communications, a multiplexed technique for interrogating transducers 102 is preferably employed in this embodiment as well.

It should be noted that many transducers mounted in bodies to be lapped can be monitored in this manner. The method of the invention can be employed at the wafer level as well as at the row level. Additionally, the multiplexed communications can be employed for monitoring additional devices associated with each transducer, as necessary.

One additional feature, which is desirable in the ELG electrical structure, is the use of materials which are preferred for the recording head environment. In this case, it is preferred to have non-corrodible materials at any exposed surfaces. In particular, as the sliders are separated, electrical conductors 52 are exposed at the surfaces between the sliders. Thus, it is preferable that electrical conductors 52 be made of non-corrodible materials such as gold, doped polysilicon, titanium nitride or other noble metals or conducting, non-corroding materials.

It will be clear to one skilled in the art that the above embodiment may be altered in many ways without departing from the scope of the invention. Accordingly, the scope of the invention should be determined by the following claims and their legal equivalents.

What is claimed is:

1. A lapping monitor for monitoring a lapping of a surface of a body having at least one transducer having a height to be lapped, said lapping monitor comprising:
   a) a lap unit for lapping said lapping surface;
   b) at least one lapping indicator mounted proximate said transducer for indicating said height of said at least one transducer;
   c) a control block provided in said body at a predetermined distance from said at least one lapping indicator for receiving indication of said height from said at least one lapping indicator;
   d) an electrical connection for communication between said at least one lapping indicator and said control block; and
   e) test contacts for establishing an external connection to said control block.

2. The lapping monitor of claim 1, further comprising a contact assembly for contacting said test contacts to establish said external connection.

3. The lapping monitor of claim 1, wherein said external connection is established by wirebonds.

4. The lapping monitor of claim 1, wherein said test contacts are positioned on said control block.

5. The lapping monitor of claim 1, wherein said at least one lapping indicator comprises a set of lapping indicators, each of said lapping indicators being associated with one of said at least one transducers.

6. The lapping monitor of claim 5, wherein said control block comprises a multiplexing logic for multiplexed communication with said set of lapping indicators.

7. The lapping monitor of claim 1, wherein said control block comprises a testing logic for performing a 4-point resistance test on said at least one lapping indicator.

8. The lapping monitor of claim 1, wherein said body is a silicon wafer and said at least one transducer comprises a set of magnetoresistive transducer heads.

9. The lapping monitor of claim 8, wherein said set of transducer heads is mounted in a row on said silicon wafer.

10. The lapping monitor of claim 9, wherein said control block is located at an end of said row.

11. The lapping monitor of claim 9, wherein said electrical connection comprises electrical conductors made of non-corrodible materials selected from the group consisting of gold, doped polysilicon, titanium nitride and noble metals.

12. The lapping monitor of claim 1, wherein said at least one transducer is selected from the group consisting of MR heads, GMR heads and advanced heads.

13. A lapping monitor for monitoring a lapping of a surface of a body having at least one transducer having a height to be lapped, said at least one transducer having a property indicative of said height, said lapping monitor comprising:
 a) a lap unit for lapping said lapping surface;
 b) a control block provided in said body at a predetermined distance from said at least one transducer for receiving indication of said height from said at least one transducer, wherein said control block comprises a testing logic for performing a 4-point resistance test on said at least one transducer;
 c) an electrical connection for communication between said at least one transducer and said control block;
 d) test contacts for establishing an external connection to said control block; and
 e) a contact assembly for contacting said test contacts to establish said external connection.

14. The lapping monitor of claim 13, wherein said test contacts are positioned on said control block.

15. The lapping monitor of claim 13, wherein said at least one transducer comprises a set of transducers and said control block comprises a multiplexing logic for multiplexed communication with said set of transducers.

16. The lapping monitor of claim 13, wherein said body is a silicon wafer and said transducers are magnetoresistive transducer heads.

17. The lapping monitor of claim 13, wherein said magnetoresistive transducers are mounted in a row on said silicon wafer.

18. The lapping monitor of claim 17, wherein said control block is located at an end of said row.

19. The lapping monitor of claim 17, wherein said electrical connection comprises electrical conductors made of non-corrodible materials selected from the group consisting of gold, doped polysilicon, titanium nitride and noble metals.

20. A method for monitoring the lapping of a lapping surface of a body having at least one transducer having a height to be lapped, said method comprising:
 a) mounting at least one lapping indicator proximate said at least one transducer for indicating said height of said at least one transducer;
 b) providing a control block in said body at a predetermined distance from said at least one lapping indicator for receiving indication of said height from said at least one lapping indicator;
 c) establishing an electrical connection for communication between said at least one lapping indicator and said control block;
 d) providing test contacts for establishing an external connection to said control block; and
 e) lapping said lapping surface.

21. The method of claim 20, further comprising contacting said test contacts for establishing an external connection.

22. The method of claim 20, further comprising applying a 4-point test to said at least one lapping indicator.

23. A method for monitoring the lapping of a lapping surface of a body having at least one transducer having a height to be lapped, said at least one transducer having a property indicative of said height, said method comprising:
 a) providing a control block in said body at a predetermined distance from said at least one transducer for receiving indication of said height from said at least one transducer;
 b) establishing an electrical connection for multiplexed communication between said at least one transducer and said control block;
 c) providing test contacts for establishing an external connection to said control block;
 d) contacting said test contacts with a contact assembly to establish said external connection; and
 e) lapping said lapping surface.

24. The method of claim 23, further comprising contacting said test contacts for establishing an external connection.

25. The method of claim 23, further comprising applying a 4-point test to said at least one transducer.

* * * * *